United States Patent
Kempf et al.

(10) Patent No.: US 9,832,484 B2
(45) Date of Patent: Nov. 28, 2017

(54) STILL BLOCK DETECTION IN A VIDEO SEQUENCE

(71) Applicant: Texas Instruments Incorporated, Dallas, TX (US)

(72) Inventors: Jeffrey Matthew Kempf, Dallas, TX (US); Daniel Jay Morgan, McKinney, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 165 days.

(21) Appl. No.: 14/718,004

(22) Filed: May 20, 2015

(65) Prior Publication Data

US 2016/0345021 A1 Nov. 24, 2016

(51) Int. Cl.
H04N 19/53 (2014.01)

(52) U.S. Cl.
CPC .................................. *H04N 19/53* (2014.11)

(58) Field of Classification Search
None
See application file for complete search history.

(56) References Cited

U.S. PATENT DOCUMENTS

| | | | |
|---|---|---|---|
| 6,437,306 B1 * | 8/2002 | Melen ....................... | G06T 5/50 250/208.1 |
| 7,375,760 B2 | 5/2008 | Kempf et al. | |
| 8,111,324 B2 | 2/2012 | Kempf et al. | |
| 2008/0226148 A1 * | 9/2008 | Gu ........................... | G06T 5/007 382/128 |
| 2009/0103621 A1 * | 4/2009 | Numata ................... | H04N 5/145 375/240.16 |
| 2011/0170738 A1 * | 7/2011 | Horovitz ............. | G06K 9/00664 382/100 |
| 2011/0175883 A1 * | 7/2011 | Toyotaka .............. | G09G 3/3648 345/211 |
| 2012/0200684 A1 * | 8/2012 | Glukhovsky ....... | A61B 1/00009 348/65 |
| 2014/0115619 A1 * | 4/2014 | Deng ................. | G06F 17/30799 725/19 |
| 2014/0160341 A1 | 6/2014 | Tickoo et al. | |
| 2014/0161309 A1 * | 6/2014 | Chiang .............. | G06K 9/00355 382/103 |
| 2014/0208274 A1 * | 7/2014 | Smyth ................... | G06F 3/0304 715/863 |
| 2015/0178953 A1 * | 6/2015 | Gao .................... | G06F 17/2765 345/681 |
| 2015/0363635 A1 * | 12/2015 | Suri ................... | G06K 9/00268 386/241 |

* cited by examiner

Primary Examiner — Reza Aghevli
(74) Attorney, Agent, or Firm — Michael A. Davis, Jr.; Charles A. Brill; Frank D. Cimino

(57) ABSTRACT

A video display system is configured to receive a sequence of image frames. Each frame is divided into a set of blocks. A center of mass is calculated for each block in a first frame and is saved for all blocks in the first frame. A center of mass is calculated for each block in a second frame. Motion between the first frame and the second frame is detected by comparing the center of mass of each block in the second frame to the center of mass of the corresponding block in the first frame, in which a still block is detected when a corresponding block in the first frame and the second frame have a same center of mass, and in which motion in a block is detected when a corresponding block in the first frame and the second frame have a different center of mass.

18 Claims, 10 Drawing Sheets

STILL BLOCK DETECTION IN A VIDEO SEQUENCE

BACKGROUND OF THE INVENTION

Field of the Invention

Embodiments of the present invention generally relate to reducing power consumption in a mobile device.

Description of the Related Art

Hand-held projectors, such as the DLP® Pico Projector available from Texas Instruments, are gaining in popularity as they get embedded into light-weight portable consumer electronic devices such as smart phones and cameras. Stand-alone pico projectors may also be used as companion products for portable devices such as cameras, mobile phones, and tablets. These pico projectors provide a convenient way to quickly project the content of these devices onto any surface such as walls, notebooks, or airplane food trays, for example. An array of portable projection screens is also available for pico projectors. Pico projectors may use either an LED or laser light source which effectively eliminates the need for lamp replacement over the useful life of a pico projector.

BRIEF DESCRIPTION OF THE DRAWINGS

Particular embodiments in accordance with the invention will now be described, by way of example only, and with reference to the accompanying drawings.

Figure 1:
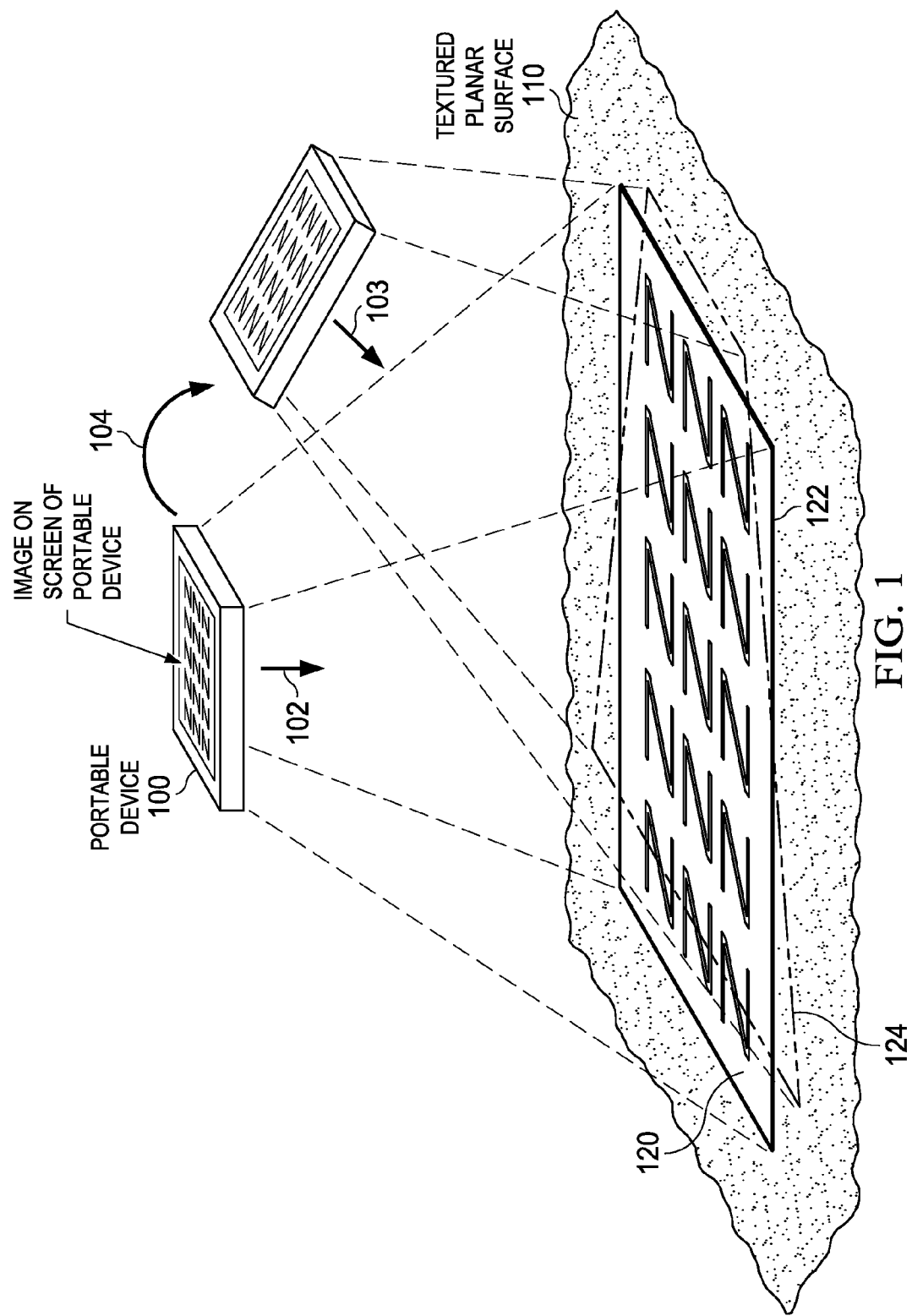
FIG. 1 is a pictorial illustration of a smart phone 100 with an embedded projector being held in various poses.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

For battery operated pico projectors, power consumption minimization is a top priority. Typically, video signal processing logic to perform image warping and other image pre-processing as well as a formatter frame memory are constantly running with each new frame and occupy a substantial amount of the power budget. Embodiments of the disclosure as described herein may exploit the highly redundant nature of typical video sequences and turn off portions of the processor logic when no new data has been encountered.

As will be described in more detail below, a still block detection (SBD) scheme may be used to divide the input image into distinct blocks. The illumination center of mass, a two-dimensional coordinate, may be calculated for each block and stored in a decimated frame memory, requiring over an order magnitude less storage than a full resolution frame memory. If the center of mass (COM) for a given block between two successive frames does not differ, then it may be assumed that movement has not been detected in that block; in other words, that block is "still". The downstream processing blocks may be turned off for either a frame or block basis, depending on whether some or all of the blocks in a frame are still.

A simple checksum approach could be used instead of the center of mass. In this case, data compaction is great so there is minimal memory overhead. However, this compaction also has its weakness. Movement of fine structures (mouse, cursor, touch event, etc.) may be missed with a checksum approach. Another solution may use highly decimated image frames. In particular, each incoming video frame may be decimated to a small size; one deemed cost feasible from a memory perspective. The disparity between successive, decimated images may then be used to derive a motion signal. This approach also uses minimal memory resources but has the same problem of observability. Fine structures with high frequency content would be highly attenuated by the decimation process and subtle changes in position would most likely be missed by this approach.

A key problem in using a projector in a hand-held device is the unwanted perspective distortion of the display window caused when the projector is not held perfectly perpendicular to the projection surface. This distortion is sometimes referred to as keystone distortion. A telltale artifact of keystone distortion is that a rectangle in the projector plane appears as a non-right-angled quadrilateral on the projection surface. Keystone distortion is often defined to be when a rectangle projects specifically onto a trapezoid.

FIG. 1 is a pictorial illustration of a smart phone 100 with an embedded projector being held in various poses. At a first position, or pose, represented by vector 102, a projector embedded in the smart phone may project an image onto planar screen surface 110. In this illustration, the projector is assumed to be oriented to project perpendicular to the display screen on smart phone 100. However, in other embodiments, the projector may be oriented to project from a side, such as a top end of a smart phone; such a configuration is provided by a Galaxy Beam smart phone available from Samsung Electronics Co. Ltd., for example.

As illustrated, pose 102 is approximately perpendicular to screen surface 110 and a projected image 120 is in the form of a right angle rectangle, which provides an undistorted view of image 120. When phone 100 is moved through some random displacement 104 to new pose represented by vector 103, the projected image will naturally be distorted in a keystone fashion as illustrated by outline 124. As described in more detail in patent publication 20140160341, Manasvi Tickoo, et al; entitled "Maintaining Distortion-Free Projection From a Mobile Device," which is incorporated herein by reference, an embodiment of the disclosure may allow a virtual frame 122 to be selected by a user of smart phone 100 and registered, or "pinned," to surface 110 so that even when the phone is moved to other poses, such as pose 103, the projected image will still appear within virtual frame 122.

In other embodiments, a user may need to provide explicit input to a projector device in order to define a particular pose position for the projector, for example. In any case, after a projector pose is determined, that information may be used to pre-process image data prior to projection in order to compensate for relocation motion and thereby eliminate perspective distortion when the image is displayed on screen.

Besides keystone correction, image preprocessing may be performed on each frame of data to perform various tasks, such as resizing, color space conversion, brightness adjustment, gamma correction, etc. Processing each frame of image data prior to projecting it may therefore require a significant amount of power, which in turn shortens battery run time for the projector device.

Figure 2:
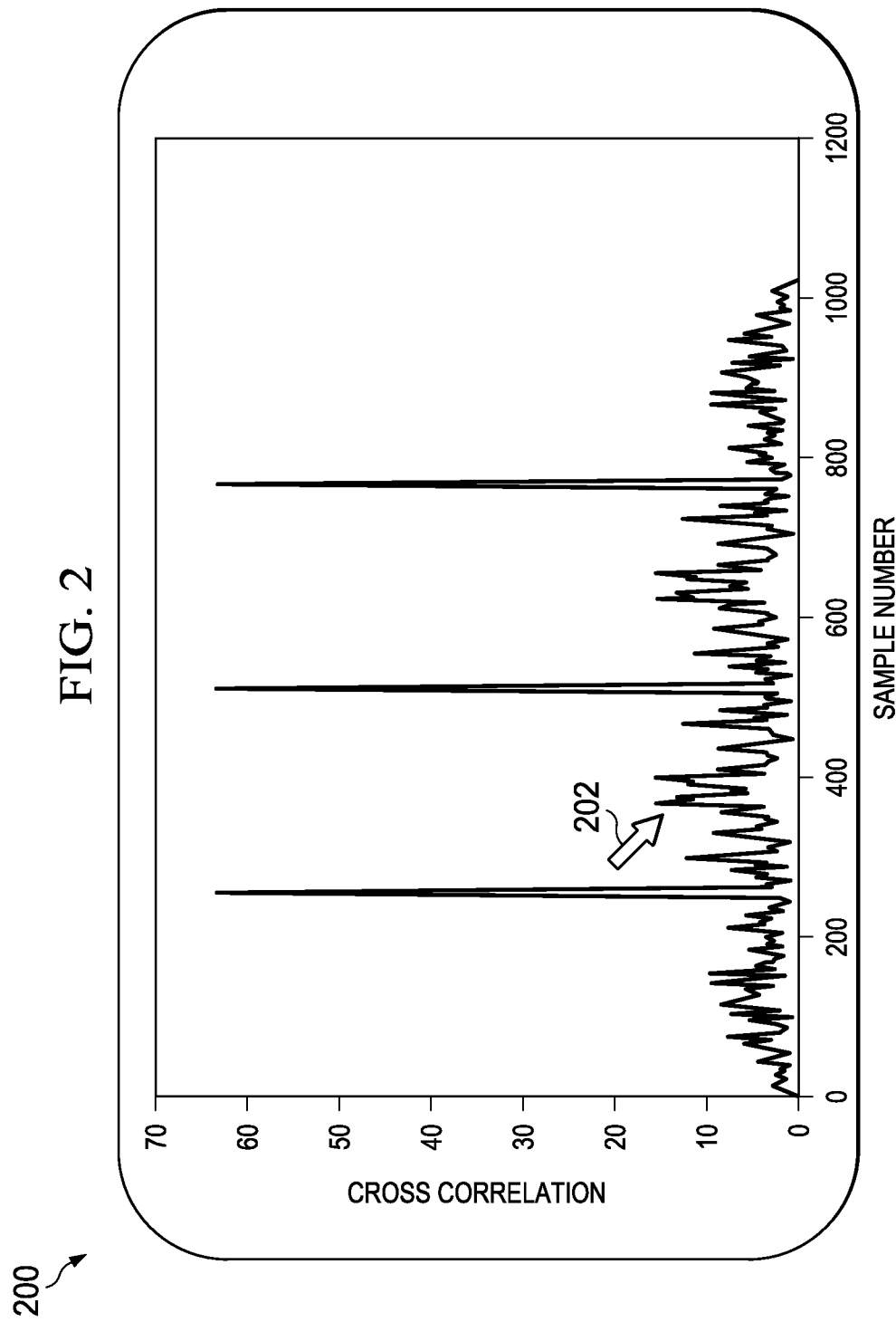
FIG. 2 is an example of an image that may be projected by a projector.

FIG. 2 is an example of an image 200 that may be projected by a projector, such as the pico projector contained within mobile device 100 of FIG. 1. This figure is merely illustrative of a synthetic image that a user of the projector may be sharing with others, for example. In this example, image 200 is a plot of data. The user may be using a mouse icon 202 to point to a particular region of interest in the data, for example. As used herein, the term "synthetic image" refers to an image that is generated by an application running on a computer, as opposed to a video sequence or a picture image that is generated by a camera. For example, a synthetic image may be an image of the screen of a computer, or an image produced by an application, such as: PowerPoint, a spread sheet, a word processor, etc.

Synthetic images are well suited for allowing a reduction in processing power dissipation because typically only a small distinct part of the image may be changing, such as mouse curser 202 in this example.

Figure 3:
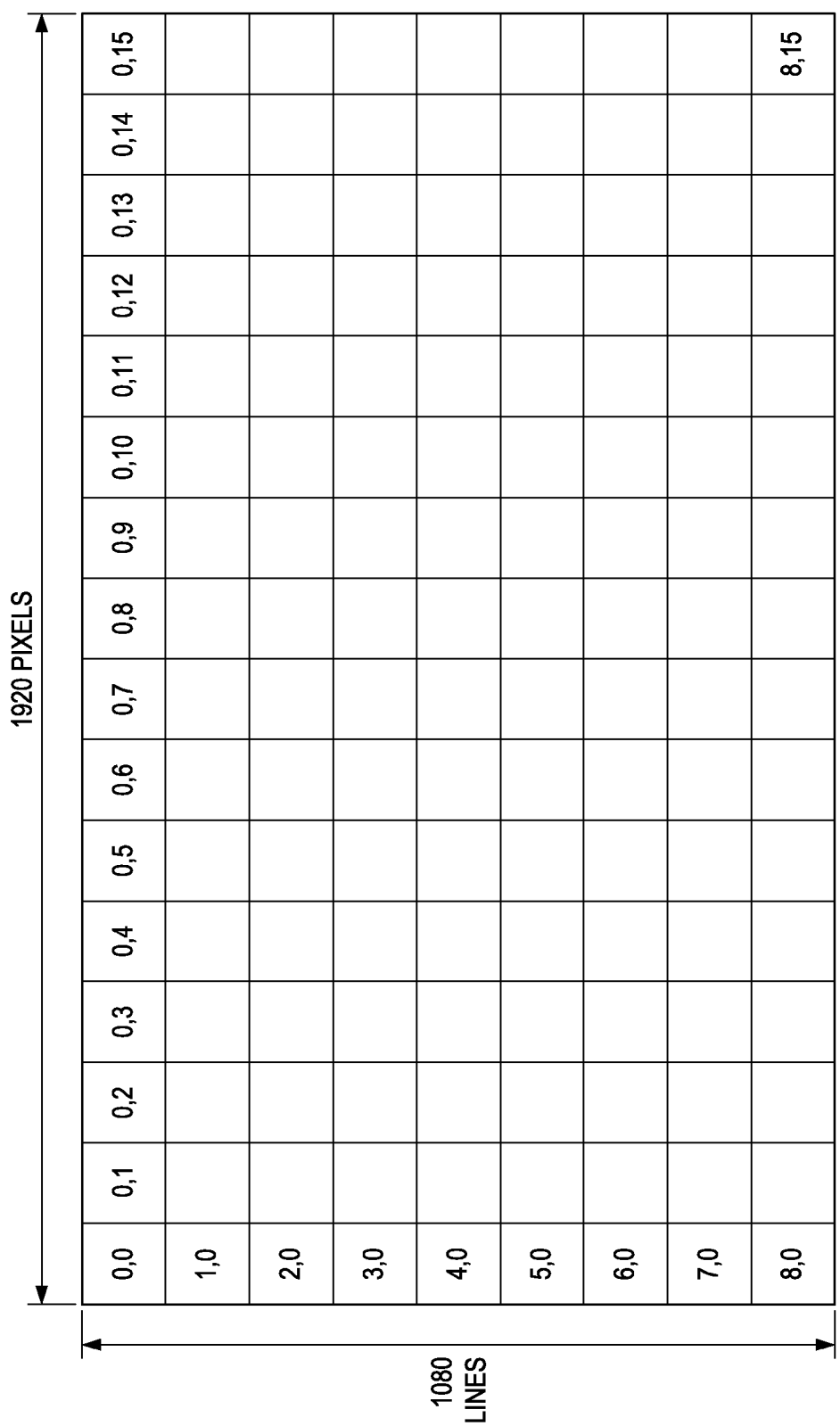
FIGS. 3 and 4 illustrate an example array of blocks that may be used to divide an image for calculation of centers of mass within each block.
Figure 4:
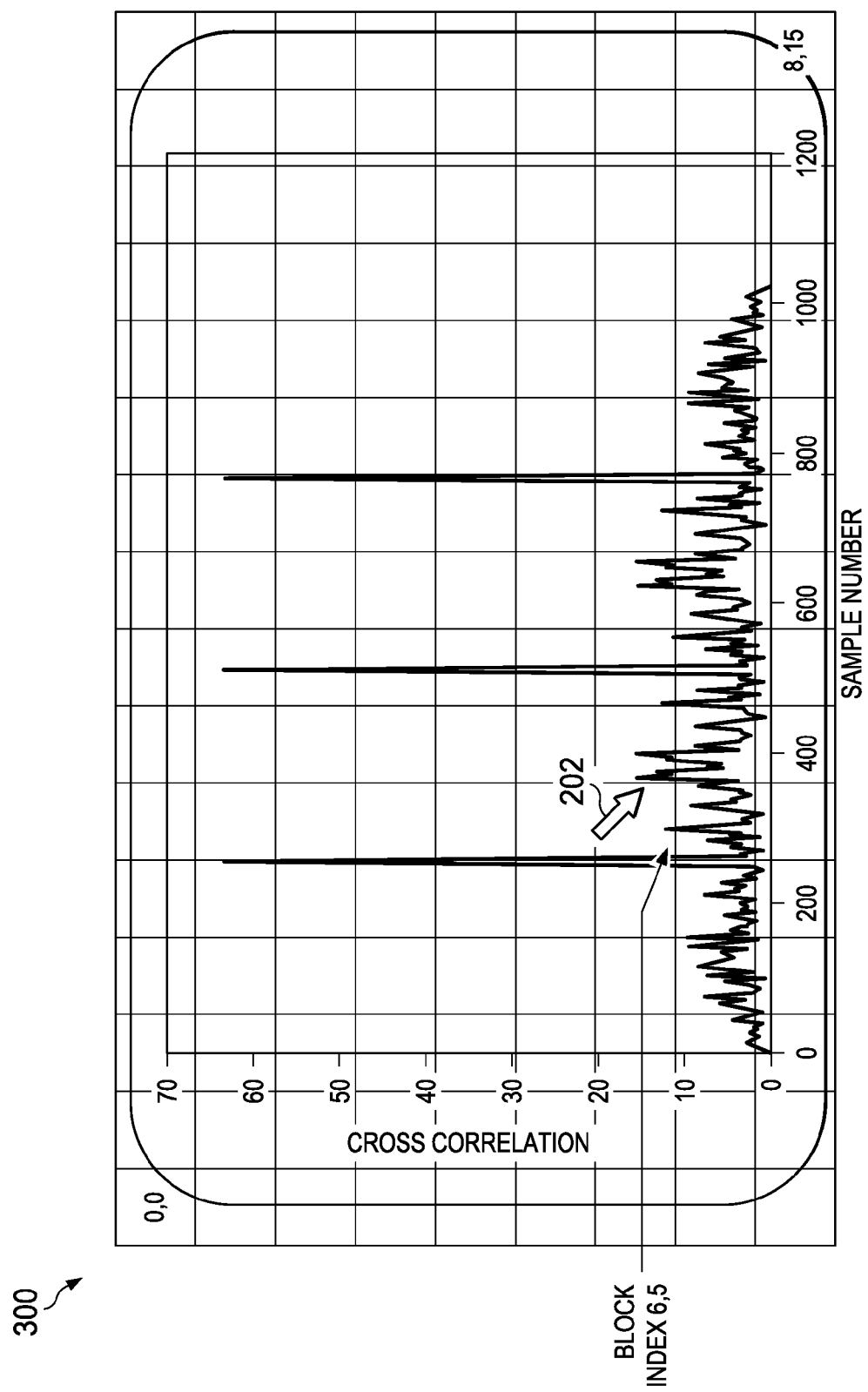

FIGS. 3 and 4 illustrate an example array of blocks 300 that may be used to segregate an image for calculation of centers of mass within each block. In this example, the projector has a resolution of 1920 pixels by 1080 lines. Block array 300 is an array of sixteen blocks horizontal by nine blocks vertical, which results in a block size of 120 pixels by 120 lines. Each block may be denoted by an index having the form x,y, for example. Other block array sizes may be used, such as an array of 32 horizontal by eighteen vertical for a block size of 60 pixels by 60 lines. Larger or smaller block sizes may be used. Rectangular blocks may also be used, as opposed to square ones. In some embodiments, blocks within the array may have different sizes and/or shapes, for example. In some embodiments, the block size may be fixed, while in other embodiments the block size may be selectable across a range of block sizes. A register or other storage device may be programmed to specify a block size, for example.

FIG. 4 illustrates synthetic image 200 segregated into an array of blocks 300. As can be seen, mouse icon 202 is contained within block 6,5, for example. In this example, as a user moves the mouse, only block 6,5 will have any motion. All of the rest of the blocks are still. Therefore, image warping and other pre-processing for this frame only needs to be performed on the one block that has motion. A significant power reduction may be realized by detecting which blocks in a frame have motion and which blocks are still and only processing the blocks that have motion. A technique for detecting when one or more blocks within a frame are still is referred to herein as still frame detection (SFD), and will now be described in detail.

Still Frame Detection

In this example, a center of mass may be calculated for each block based on the brightness component of a luma/chroma format signal. If not already in a luma/chroma format, the video source data may be converted using known or later developed techniques so that a brightness signal is derived from the video source. The COM calculations may then operate on this brightness signal. Table 1 provides example pseudo-code for performing a conversion from a 24 bit red, green, blue signal to a single luminance value, $Y(7:0)$.

TABLE 1

Pseudo-for for RGB to Y conversion $Y(7:0)$ = round_u8.0 ((in_r_vq(7:0) * 77 + in_g_vq(7:0) * 150 + in_b_vq(7:0)* 29)/256)
// round[((u8.0)(u7.0) + (u8.0)(u8.0) + (u8.0)(u5.0))/256] =
// round[((u15.0) + (u16.0) + (u13.0))/256] =
// round[(u16.0 + u16.0)/256] = round(u17.0/256) = remove LSB (remove 7 LSBs (u9.8) + 1) =
// remove LSB (u9.1 + u0.1) = remove LSB (u10.1) = u10.0 → limit to u8.0

Where unsigned numbers are preceded by a "u", and signed numbers are preceded by an "s". These prefixes are then followed by the number of significant bits. A period "." separates the number of significant bits and fractional bits.

Referring still to FIG. 4, the image may be divided into distinct blocks 300. In this example, the image may be divided into at most 32 blocks per line. However, in another embodiment storage may be provided for more than 32 blocks per line. Intermediate results for the vertical and horizontal center of mass are calculated as new pixels are encountered. These intermediate results may stored in small FIFOs (first in first out buffer), which are 32 entries long in this example. For instance, if the block size is 40 and the SFD is observing the $90^{th}$ pixel of a line, it will be processing it for block=truncate (90/40)=2. When the input pixels is a non integer multiple of the block size and the pixels in the last block is less than five, then that block may be ignored Once all pixels for a particular block have been observed, the final center of mass values may be calculated and each corresponding FIFO entry may be reset.

Two separate techniques may be used for calculating the horizontal (x) and vertical (y) coordinates of the COM of each block. Each technique is optimal for the dimension that it is operating upon. The y coordinate may be found by summing pixels horizontally and identifying the row location of the largest summation. Only two memory elements are required per block to calculate this vertical coordinate. One element may store the maximum, and the other element may store its corresponding position.

In this embodiment, the sum of all pixels within the current line for a given distinct block is referred to as HSUM(14:0). The maximum HSUM(14:0) as well as its vertical intra-block position may be calculated for each distinct block. The FIFOs VMAX_FIFO[n] and VMAX_POS_FIFO[n] may be used to store intermediate results as each block is processed in a raster scan manner. Since at most 32 blocks may be processed for a given line in this embodiment, these FIFOs only need to be 32 entries deep. Table 2 provides an example y coordinate calculation for a block size of 20. In this example, the maximum HSUM(14:0) is equal to 4752 and occurs on vertical intra-block position 3.

TABLE 2

Example y coordinate calculation for a block size of 20

| Vertical Intra-Block Position | HSUM(14:0) |
| --- | --- |
| 0 | 78 |
| 1 | 3809 |
| 2 | 2270 |

TABLE 2-continued

Example y coordinate calculation for a block size of 20

| Vertical Intra-Block Position | HSUM(14:0) |
|---|---|
| 3 | 4752 |
| 4 | 2377 |
| 5 | 2135 |
| 6 | 4316 |
| 7 | 2678 |
| 8 | 1034 |
| 9 | 3428 |
| 10 | 4274 |
| 11 | 100 |
| 12 | 3475 |
| 13 | 1935 |
| 14 | 4242 |
| 15 | 2564 |
| 16 | 3618 |
| 17 | 2187 |
| 18 | 1554 |
| 19 | 967 |

In this embodiment, the x coordinate does not employ this technique because it would require an entire line memory to calculate a vertical summation of pixels. Instead, a weighted mean approach may be used. Each pixel is multiplied by its corresponding inter-block horizontal position, and all products are summed. This summation may be normalized by the sum of non-weighted pixels. This approach is more computationally expensive, requiring multiplies, but it is much less memory intensive, requiring just two memory elements per block, one for the weighted summation and the other for the non-weighted summation. However, in another embodiment the same technique may be used for both the x and y calculations by providing a full line memory, for example.

Once all pixels for a distinct block have been encountered, the SFD logic may derive the horizontal center of mass, as described above. The SFD logic may then compare the vertical and horizontal center of mass positions of each block between the current and previous frames. If any differ, the SFD logic may set a flag that signifies that motion has been detected in the current frame. In some embodiments, there may be a set of flags, one for each block. In other embodiments, there may be only one flag for an entire frame, for example.

Figure 5A:
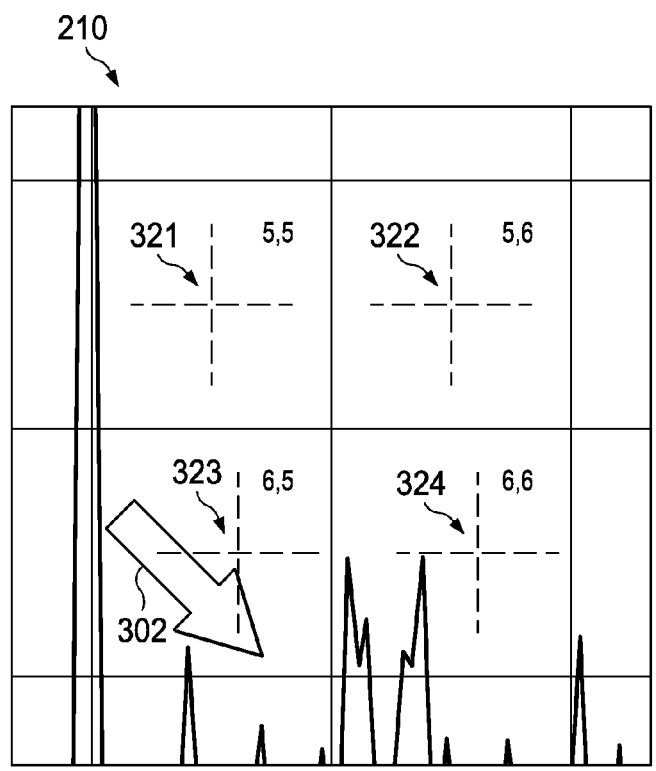
FIGS. 5A-5B illustrate detection of movement within a block.
Figure 5B:
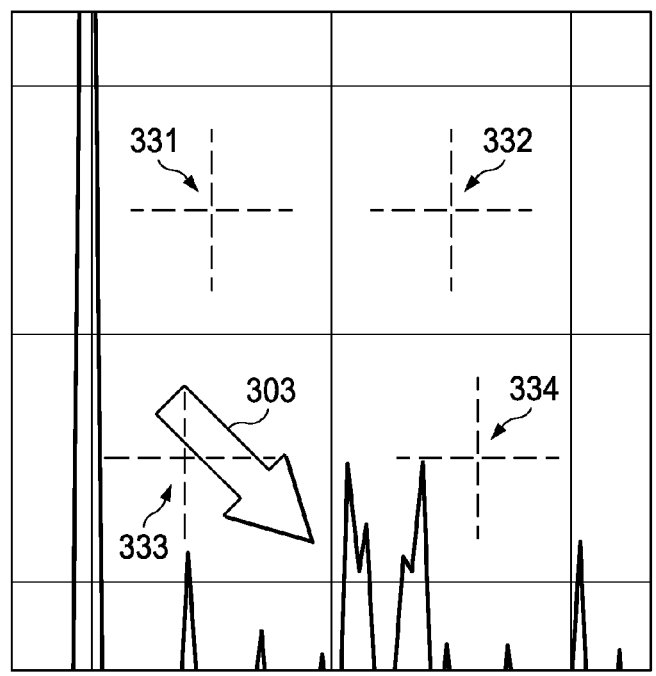

FIGS. 5A-5B illustrate detection of movement within a block. For simplicity, FIGS. 5A, 5B illustrate only four blocks (5,5), (5,6), (6,5) and (6,6) taken from FIG. 4, however, all blocks are processed in a similar manner. FIG. 5A represents a first frame, while FIG. 5B represents a subsequent frame. As described above, a COM 321-324 is determined for each block in the first frame and saved in a memory element of the decimated frame buffer. Similarly, a COM 331-334 is determined for each block in the second frame and compared to the saved values for the corresponding blocks in the decimated frame buffer. In this example, notice that COM 333 is different from 323 because the mouse cursor 303 has moved slightly to the right in FIG. 5B as compared to mouse cursor 302; therefore motion has been detected in block (6,5). No motion has occurred in the other three blocks, therefore COM 331, 332, 334 are the same as corresponding COM 321, 322, 324. Blocks (5,5), (5,6) and (6,5 may therefore be treated as being still.

Figure 6:
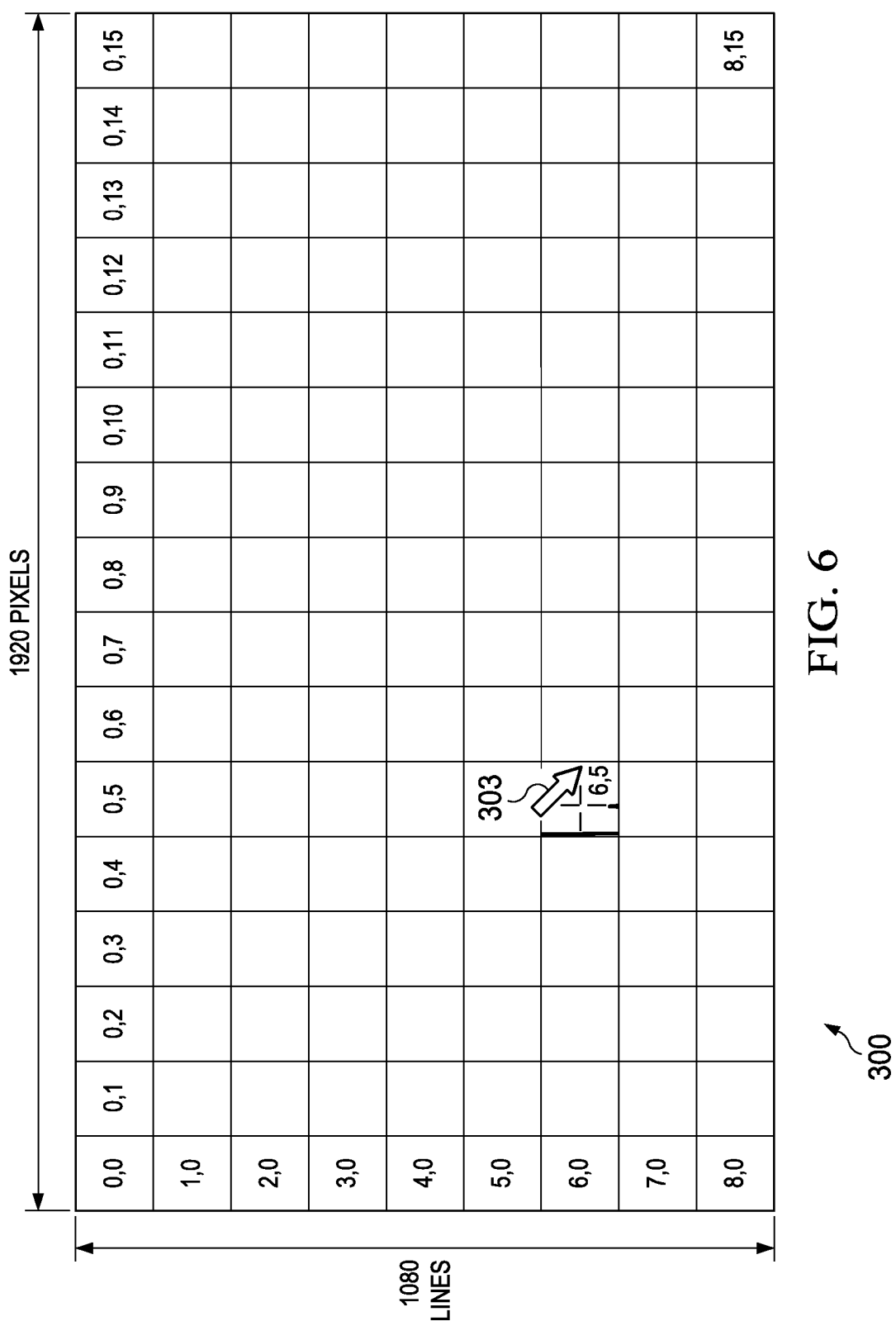
FIG. 6 illustrates a potential reduction of processing and power dissipation based on still block detection.

FIG. 6 illustrates a potential reduction of processing based on still block detection. Note that in the entire frame, motion was detected only in block index (6,5) while all of the other blocks are still. Therefore, image warping and other pre-processing only needs to be performed on block (6,5) for this frame. All of the other blocks have been determined to be still and the previous image data may be retained. In this manner, power dissipation for processing logic may be reduced. Similarly, power dissipation produced by writing to the frame buffer may be reduced, since only block (6,5) needs to be updated in the frame buffer.

Table 3 provides a summary of the various memory structures that may be used to implement the SFD technique for the embodiment described above.

TABLE 3

Memory structures for up the 32 blocks per line

| Name | Abbreviation | Description |
|---|---|---|
| Vertical Maximum FIFO | VMAX_FIFO[n] | 32 × 15-bit single-port RAM |
| Vertical Maximum Position FIFO | VMAX_POS_FIFO[n] | 32 × 7-bit single-port RAM |
| Block Summation FIFO | BS_FIFO[n] | 32 × 22-bit single-port RAM |
| Weighted Horizontal Sum FIFO | WHS_FIFO[n] | 32 × 28-bit single-port RAM |
| Normalization LUT | NORM_LUT[n] | 2048 × 12-bit single-port ROM |
| Vertical Center of Mass FIFO | VCOM_FIFO[n] | 640 × 7-bit single-port RAM |
| Horizontal Center of Mass FIFO | HCOM_FIFO[n] | 640 × 12-bit single-port RAM |

Two modes may be embodied by this base architecture. In one other mode, downstream processing may be disabled on a block basis within a frame, as described above, for example. In the other mode, downstream processing may be disabled on a frame by frame basis.

Figure 7A:
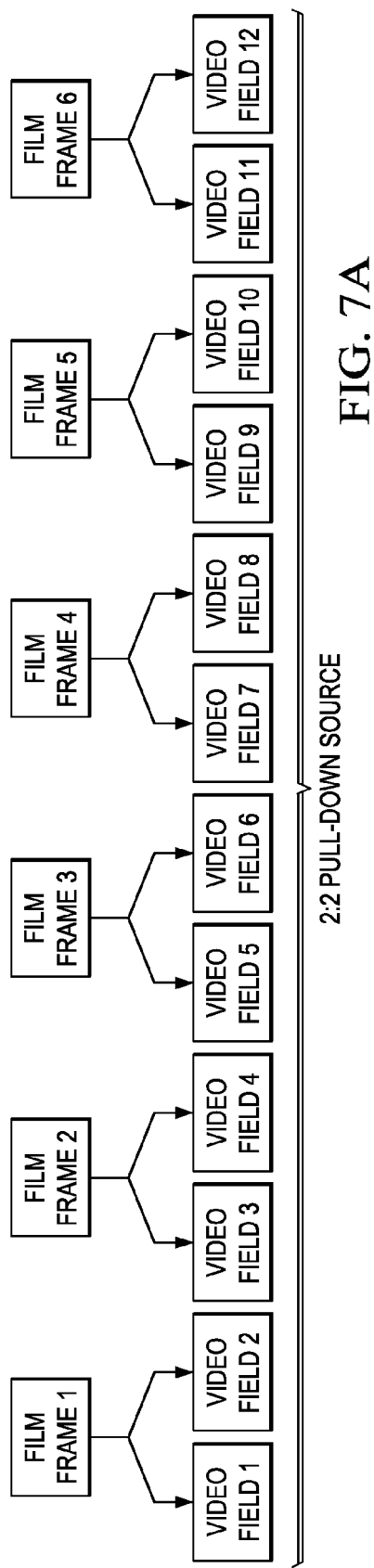
FIGS. 7A-7B illustrate cadence detection.
Figure 7B:
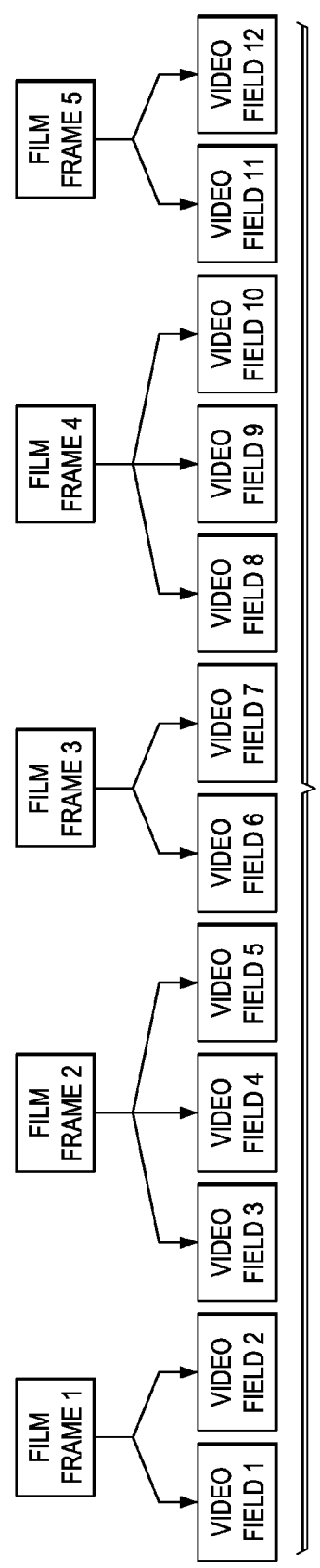

FIG. 7A illustrates 2:2 cadence while FIG. 7B illustrates 3:2 cadence. When frame-based disablement is implemented, frame movement may be analyzed over time to determine whether a 2:2 or 3:2 cadence is present. Film is captured at 24 frames per second (24 Hz), so a 2:2 pull-down technique is typically used to create a 50 Hz video signal such as PAL (4 fields/2 frames*24 frames/s≈50 Hz). A 3:2 pull-down technique is typically used to create a 60 Hz video signal such as NTSC (5 fields/2 frames*24 frames/s=60 Hz).

A 2:2 cadence may be detected by simply looking for a 0, 1, 0, 1, 0, 1 temporal pattern on the frame detection flag produced by the SFD logic, as described above. Once that pattern has been detected, the system may disable the appropriate processing blocks and corresponding clocks for the repeated frames and re-enable them for each new frame, following the 2:2 cadence. In all, processing clocks may be disabled for every other frame. This 2:2 cadence mode is disabled when movement is detected on a position where a repeated frame should occur. However, it may remain enabled when no movement is detected on a position where movement is expected.

A 3:2 cadence is detected by simply looking for a 0, 1, 0, 0, 1, 0, 1, 0, 0, 1 temporal pattern on the frame detection flag produced by the SFD logic. Once that pattern has been detected, the system may disable the appropriate processing blocks and corresponding clocks for the repeated frames and re-enable them for each new frame, following the 3:2 cadence. In all, processing clocks may be disabled for ⅗th of the time. This 3:2 cadence mode is disabled when movement is detected on a position where a repeated frame should occur. It may remain enabled when no movement is detected on a position where movement is expected.

Additionally, if there is significant number of frames where no motion is present, the system may disable the appropriate processing blocks and corresponding clocks, regardless of whether a film cadence has been detected. The system would then enable the appropriate processing when motion is detected.

When block based disablement is implemented, logic may be added to account for the one frame latency. In particular, an object may have moved from one block to another within that latency. To account for this latency, dilation may be applied. In other words, stationary blocks that are within a particular range of a moving block may be re-categorized as moving. This dilation range may be based on the maximum expected motion between successive frames. For example, if a block size is 20×20, and the maximum expected motion between frames is 15 pixels, then the eight blocks surrounding each moving block may be re-categorized as moving, for example.

Figure 8:
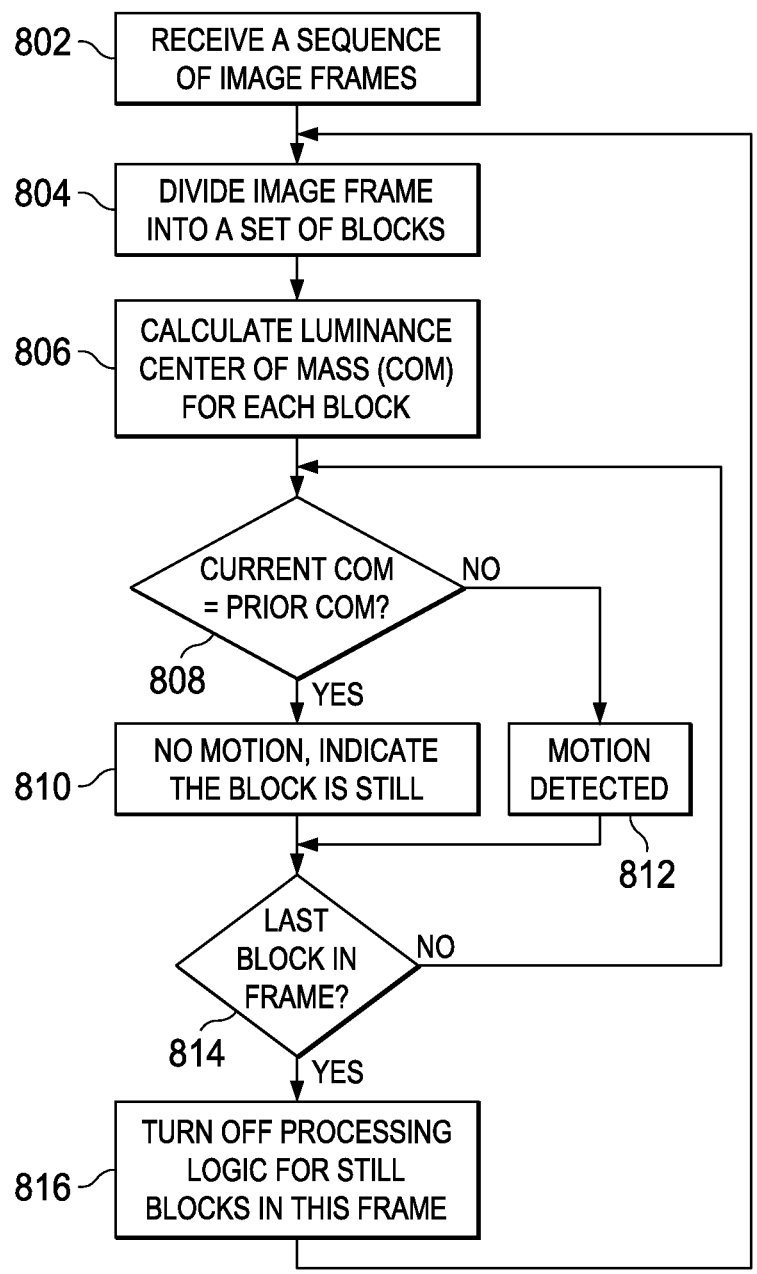
FIG. 8 is a flow chart illustrating a method for reducing power dissipation based on still block detection.

FIG. 8 is a flow chart illustrating a method for reducing power dissipation in a projection system based on still block detection. As discussed above in more detail, a pico projector may be implemented as a standalone projector, or may be embedded in another device, such as a cell phone, for example. A sequence of image frames may be received 802 for projection by the projector. The image frames may be provided by an application running on a computer system, as described above, or they may be a video sequence, for example. Video sequences may require decoding if they have been compressed using a known or later developed compression technique, such as MPEG (moving picture experts group standard), JPEG (joint photographic experts group standard), etc.

After being decoded, if needed, each image frame may be divided 804 into an array of blocks, such as array 300 described above. As described above in more detail, a center of mass may be calculated 806 for each block based on the brightness component of a luma/chroma format signal. If not already in a luma/chroma format, the video source data may be converted using known or later developed techniques so that a brightness signal is derived from the video source.

The vertical and horizontal center of mass positions of each block may be compared 808 between the current frame and the previous frame. If any differ, the SFD logic may set a flag 812 that signifies that motion has been detected in the current frame. Otherwise, the block may be deemed 810 as being still. In some embodiments, there may be a set of flags, one for each block. In other embodiments, there may be only one flag for an entire frame, for example.

After the last block of a frame is processed 814, portions of the image warping and pre-processing logic may be turned off 816 for any blocks or entire frames in which no motion is detected.

With this approach, memory and computation requirements are low. COM calculations are optimized for each dimension. Subtle movements in fine structures are easily detectable since they directly affect the COM results.

Figure 9:
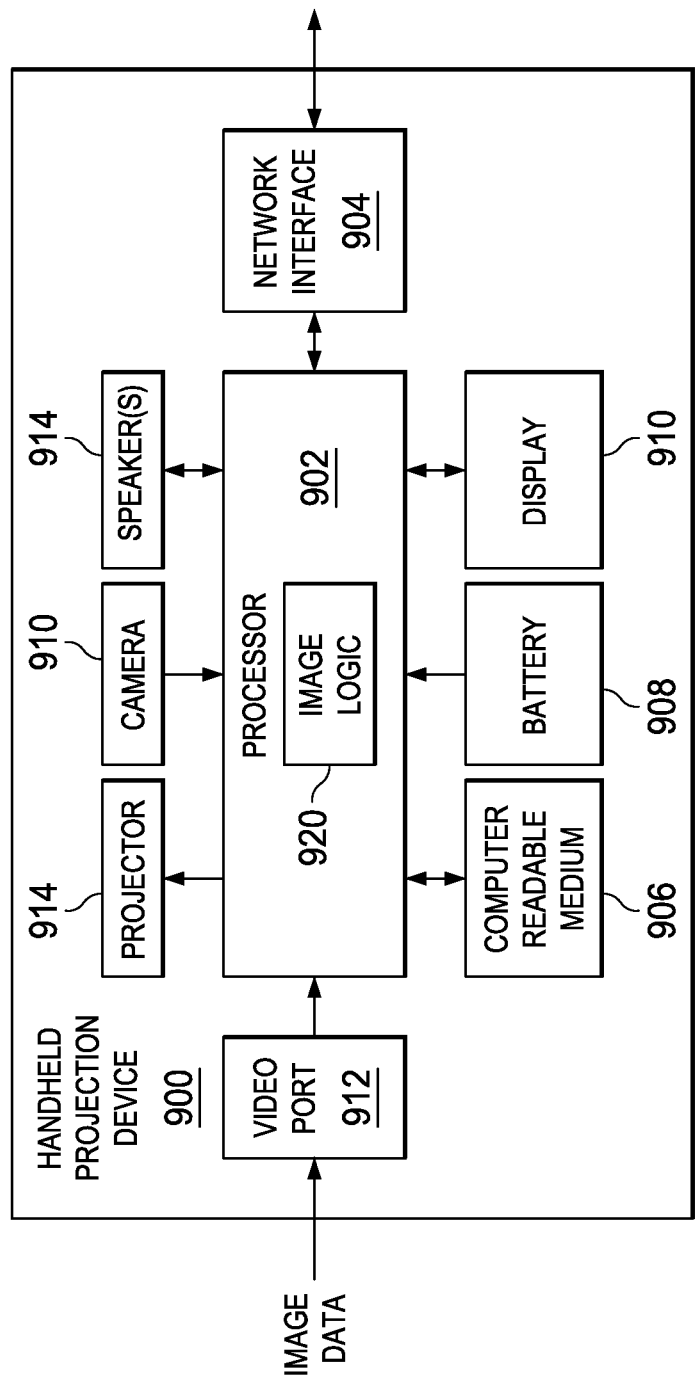
FIG. 9 is a block diagram of a mobile device that includes a pico projector.

FIG. 9 is a block diagram of an example handheld projection system 900. The system 900 includes various electronic circuitry components for performing system operations implemented in a suitable combination of software, firmware, and hardware. Such components include a processor 902 (e.g., one or more microprocessors and/or digital signal processors) for executing software instructions that implement at least some system operations, a network interface 904 for communicating information to and from a network in response to signals from the processor 902, and a computer-readable medium 906, such as a nonvolatile storage system and/or a random access memory ("RAM") system, for storing software instructions programs and other information. The system 900 also includes a battery 908 providing power for the system 900. A display 910 may be provided that includes a screen for displaying information to a user and for receiving information from the user in response to signals from the processor 902. Speaker(s) 914 may be provided for outputting sound waves in response to signals from the processor 902. A camera 910 may be included for pose determination in some embodiments.

As shown in FIG. 9, the processor 902 may be connected to the computer-readable medium 906, the battery 908, the display 910, the speaker 914, the projector 914 and the camera 910. For clarity, although FIG. 9 shows the battery 908 connected to only the processor 902, the battery 908 may be further coupled to various other components of the system 900. Also, the processor 902 may be coupled through the network interface 904 to a network (not specifically shown), such as the Internet or an intranet. The network interface may be wireless or may be a USB interface or an internet interface, for example.

Image data may be received via a video port 912, which may be connected to a computer such as a laptop, a tablet, etc. Video port 912 may be implemented to support one or more standard or special purpose interfaces, such as: HDMI high definition multimedia interface), DVI (digital visual interface), VGA (video graphics array), etc. as needed for a particular embodiment. Image data may also be received via the network interface 904, for example. After being received, image data may be processed by processor 902 with assistance from image processing logic 920 in preparation for projection by projector device 914. Image processing logic 920 may contain logic to assist with image compression decoding, such as for MPEG, JPEG, etc; frame buffer(s) to hold each image prior sending the image data to projector 914; and logic to assist with image pre-processing such as warping, color processing, etc; for example. In addition, image processing logic 920 may include logic to assist in determining COM and still blocks, as described in more detail above.

Projector 914 may be implemented using an optical semiconductor known as the DLP® DMD chip, which was invented by Dr. Larry Hornbeck of Texas Instruments in 1987. The DLP® DMD chip is perhaps the world's most sophisticated light switch. Currently, a typical DLP® DMD chip contains a rectangular array of up to 8 million hinge-mounted microscopic mirrors; each of these micromirrors measures less than one-fifth the width of a human hair. When a DLP® DMD chip is coordinated with a digital video or graphic signal, a light source, and a projection lens, its mirrors can reflect a digital image onto any surface.

A DLP® DMD chip's micro-mirrors tilt either toward the light source in a DLP® projection system (ON) or away from it (OFF). This creates a light or dark pixel on the projection surface. The bit-streamed image code entering the DLP® semiconductor directs each mirror to switch on and off up to ten thousand times per second. When a mirror is switched on more frequently than off, it reflects a light gray pixel; a mirror that's switched off more frequently reflects a darker gray pixel. In this way, the mirrors in a DLP® projection system can reflect pixels in up to 1,024 shades of gray to convert the video or graphic signal entering the DLP® chip into a highly detailed grayscale image.

The white light generated by the light source in a DLP® projection display system may pass through a color filter as it travels to the surface of the DLP® chip. This filters the light into a minimum of red, green, and blue, from which a single-chip DLP® projection system can create at least 16.7 million colors. Many DLP® projection display systems offer solid-state illumination which replaces the traditional white lamp. As a result, the light source emits the necessary colors eliminating the color filter. In some DLP® systems, a 3-chip architecture is used, particularly for high brightness projectors required for large venue applications such as concerts and movie theaters. These systems are capable of producing no fewer than 35 trillion colors.

As discussed above in more detail, device 900 may be a standalone projector device, or it may include other functionality. In some embodiments, device 900 may be a smart phone and include additional logic such as: logic to perform cellular call operations, a camera and memory for storing pictures and video, a display screen, etc.

Figure 10:
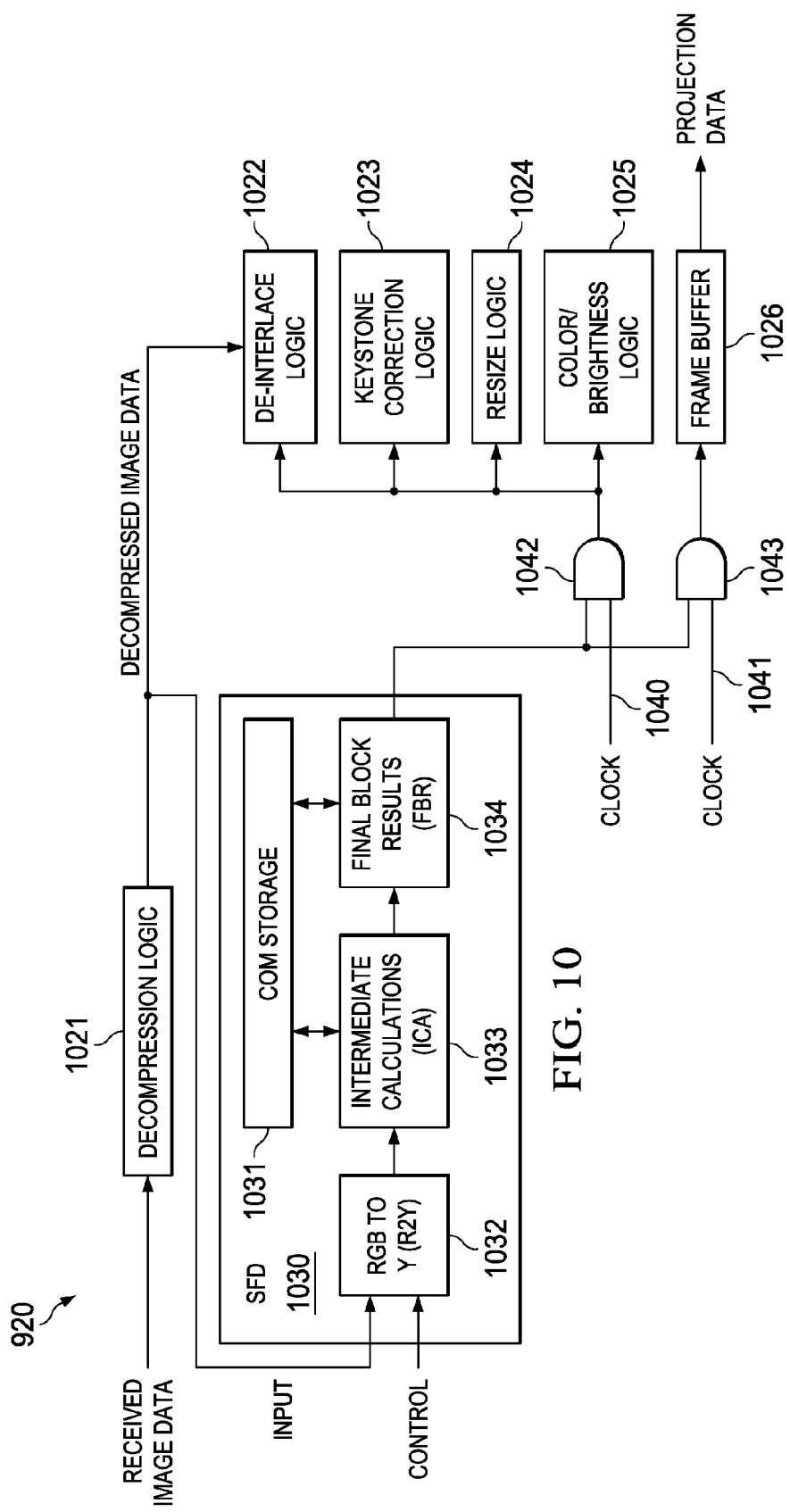
FIG. 10 is a block diagram illustrating example image processing logic in the device of FIG. 9.

FIG. 10 is a block diagram illustrating example image processing logic 920 in more detail. Decompression logic 1021 may be used to decode a compressed video stream, such as MPEG or JPEG images using known or later developed techniques. De-interlace logic 1022 may be used to merge the two fields of an interlaced frame into a non-interlaced frame using known or later developed techniques. Keystone correction logic 1023 may be used to correct image warping, as discussed in more detail above, using known or later developed techniques. Resize logic 1024 may be used to decrease or increase the pixel count of an image using known or later developed techniques. Color correction and brightness logic 1025 may be used to adjust or change the appearance of an image using known or later developed techniques. Frame buffer 1026 may be used to store the final image data prior to being sent to projector 914.

SFD logic 1030 operates as describes in more detail above. As discussed, SFD logic may be implemented in software stored in computer readable medium 906 and executed by processor 902, by specific hardware logic modules, or by a combination of both, for example. RGB to Y conversion logic may convert the incoming decompressed image data to luminance/chroma format using known or later developed techniques, as described in more detail above. Intermediate calculations (ICA) logic 1033 may perform the x and y center of mass calculations as described above in more detail. COM storage 1031 may provide storage for the results of the COM calculations, as described in Table 3. Final block results (FBR) logic 1034 may compare the current COM values to the COM values from the prior frame to determine if each block in a current frame is still or has motion, as described in more detail above.

Decompression logic 1021 may need to run continuously in order to correctly decompress the received image data. However, de-interlace logic 1022, keystone correction logic 1023, resize logic 1024, and color/brightness logic 1025 may be turned off on a frame by frame or block by block basis when SFD logic 1030 detects that a frame is still or that one or more blocks within a frame are still, as described in more detail above.

Clock signal 1040 may be provided to the various image processing blocks 1022-1025. A same or different clock 1041 may be provided to frame buffer 1026. Gates 1042-1043 may be used to gate the clock signals in order to stop the operation of the corresponding logic for a period of time and to thereby reduce power consumption. FBR logic 1034 may provide one or more control signals to control the clock gates 1042-1043.

FBR logic 1034 may be configured to keep track of the schedule for processing each block in a frame so that the processing logic 1022-1025 may be turned off during the scheduled time for processing still blocks or entire still frames, for example.

In this manner, a significant amount of processing logic may be quiesced during the time an entire still frame would have been processed, or during the time still blocks within a frame would have been processed. In this manner, a significant power reduction may be provided that may extend the operation time of a battery powered projector, for example.

Other Embodiments

While the invention has been described with respect to a limited number of embodiments, those skilled in the art, having benefit of this disclosure, will appreciate that other embodiments can be devised which do not depart from the scope of the invention as disclosed herein.

While the embodiments described herein describe a standalone mobile projector device, in another embodiment the projector device may be mounted within the housing of a mobile smart phone. In another embodiment the projector may be contained in a projector sleeve that is configured to receive and couple to a smart phone to form a combined mobile unit. In other embodiments, the projector may be part of a camera or a video camera.

While the embodiments described herein describe a projector system, embodiments of this disclosure may also be used to reduce the power consumed by a display device in mobile device such as a tablet, portable computer, etc., for example. In this case, logic that forms the image to be displayed on the display screen of the device may be controlled as described herein to reduce power consumption when still frame and or still blocks are detected.

While clock gating was described as a way to reduce the power consumed by the processing logic, in another embodiment a different and/or an additional method may be used. For example, it may be possible to reduce power consumption by gating off the data that is provided to the processing logic for a period of time.

In some embodiments, a single processor may be used to execute instructions to perform center of mass calculations, control operation of the projector, and perform image data warping prior to projection. In other embodiments, two or more processors may cooperate to perform the various tasks.

While COM based on brightness was described herein, in another embodiment COM based on darkness may be calculated. In another embodiment, COM based on color content or other defined aspects of an image may be used, for example.

While the processing logic 1022-1025 was described herein as processing the blocks in a serial manner, in some embodiments multiple sets of processing logic may be provided to perform parallel processing in the form of multiple parallel threads. In that case, additional control logic may be provided to keep track of the processing schedule and processing thread for the various blocks of image data in order to correctly turn off different threads of parallel processing hardware, for example.

Embodiments of the methods described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method of operating a video display system, the method comprising:
   receiving a sequence of image frames, including at least a first frame and a second frame;
   dividing the first frame into a first set of blocks;
   dividing the second frame into a second set of blocks, wherein each block in the second frame is spatially collocated with a respective block in the first frame;
   calculating a respective center of mass of each block in the first and second frames;
   detecting motion between the first frame and the second frame by comparing the respective center of mass of each block in the second frame to the respective center of mass of its spatially collocated block in the first frame, in which the block in the second frame is detected as being: a still block when its respective center of mass is the same as the respective center of mass of its spatially collocated block in the first frame; and a non-still block when its respective center of mass is different from the respective center of mass of its spatially collocated block in the first frame; and
   reducing power to a circuit module in the video display system in response to detecting at least one still block in the second frame.

2. The method of claim 1, wherein reducing power to the circuit module includes: reducing power to the circuit module during time(s) scheduled for processing still blocks in the second frame; and not reducing power to the circuit module during time(s) scheduled for processing non-still blocks in the second frame.

3. The method of claim 1, wherein reducing power to the circuit module includes: reducing power to the circuit module during time(s) scheduled for processing the entire second frame when all blocks in the second frame are still blocks.

4. The method of claim 1, wherein calculating the respective center of mass includes:
   summing values of all pixels in each row of pixels in the block to form a respective summation value per row; and
   selecting a row whose respective summation value is largest to be a vertical center of mass value of the block.

5. The method of claim 1, wherein calculating the respective center of mass includes:
   multiplying a value of each pixel by its horizontal position to form a weighted pixel value; and
   summing all of the weighted pixel values to form a weighted pixel summation value.

6. The method of claim 5, further including:
   summing a value of each pixel to form a non-weighted pixel summation value; and
   normalizing the weighted pixel summation value by the non-weighted pixel summation value to form a horizontal center of mass value of the block.

7. The method of claim 1, further including converting a video format of the sequence of image frames into a luminance/chroma format, wherein the respective center of mass of each block is based on the luminance values of the pixels in the block.

8. The method of claim 1, further including:
   detecting a cadence of repeated image frames by determining a repeating pattern of image frames in which all blocks within the frame are still blocks;
   wherein reducing power to the circuit module includes: reducing power to the circuit module in accordance with the repeating pattern, such that power is reduced during time(s) scheduled for processing the repeated image frames.

9. The method of claim 1, further including compensating for latency between the first frame and the second frame by redesignating a set of still blocks surrounding a non-still block to instead be designated as non-still blocks.

10. A method of operating a video display system, the method comprising:
    receiving a sequence of image frames, including at least a first frame and a second frame;
    dividing the first frame into a first set of blocks;
    dividing the second frame into a second set of blocks, wherein each block in the second frame is spatially collocated with a respective block in the first frame;
    calculating a respective center of mass of each block in the first and second frames, wherein calculating the respective center of mass includes: summing values of all pixels in each row of pixels in the block to form a respective summation value per row, selecting a row whose respective summation value is largest to be a vertical center of mass value of the block, multiplying a value of each pixel by its horizontal position to form a weighted pixel value, summing all of the weighted pixel values to form a weighted pixel summation value, summing a value of each pixel to form a non-weighted pixel summation value, and normalizing the weighted pixel summation value by the non-weighted pixel summation value to form a horizontal center of mass value of the block;
    detecting motion between the first frame and the second frame by comparing the respective center of mass of each block in the second frame to the respective center of mass of its spatially collocated block in the first frame, in which the block in the second frame is detected as being: a still block when its respective center of mass is the same as the respective center of mass of its spatially collocated block in the first frame; and a non-still block when its respective center of mass is different from the respective center of mass of its spatially collocated block in the first frame; and
    reducing power to a circuit module in the video display system in response to detecting at least one still block in the second frame.

11. The method of claim 10, further including:
    summing a value of each pixel in the block to form a non-weighted pixel summation value; and
    normalizing the weighted pixel summation value by the non-weighted pixel summation value to form the x coordinate of the respective center of mass of the block.

12. The method of claim 10, wherein reducing power to the circuit module includes: reducing power to the circuit module during time(s) scheduled for processing the entire second frame when all blocks in the second frame are still blocks.

13. The method of claim 10, further including converting a video format of the sequence of image frames into a luminance/chroma format, wherein the respective center of mass of each block is based on the luminance values of the pixels in the block.

14. A device for processing image data, the device comprising:
- a data port configured to receive a sequence of image frames, including at least a first frame and a second frame;
- image processing logic configured to process the received sequence of image frames to form a sequence of processed image frames;
- segregation logic configured to: divide the first frame into a first set of blocks; and divide the second frame into a second set of blocks, wherein each block in the second frame is spatially collocated with a respective block in the first frame;
- center of mass (COM) logic configured to calculate a respective COM value of each block;
- detection logic configured to detect motion between the first frame and the second frame by comparing the respective COM value of each block in the second frame to the respective COM value of its spatially collocated block in the first frame, in which the block in the second frame is detected as being: a still block when its respective COM value is the same as the respective COM value of its spatially collocated block in the first frame; and a non-still block when its respective COM value is different from the respective COM value of its spatially collocated block in the first frame; and
- control logic configured to reduce power to the image processing logic in response to detection of at least one still block in the second frame.

15. The device of claim 14, wherein reducing power to the image processing logic includes: reducing power to the image processing logic during time(s) scheduled for processing still blocks in the second frame; and not reducing power to the image processing logic during time(s) scheduled for processing non-still blocks in the second frame.

16. The device of claim 14, wherein calculating the respective COM values includes:
- summing values of all pixels in each row of pixels in the block to form a respective summation value per row, and selecting a row whose respective summation value is largest to be a vertical COM value of the block; and
- multiplying a value of each pixel by its horizontal position to form a weighted pixel value, summing all of the weighted pixel values to form a weighted pixel summation value, summing a value of each pixel to form a non-weighted pixel summation value, and normalizing the weighted pixel summation value by the non-weighted pixel summation value to form a horizontal COM value of the block.

17. The device of claim 14, further including: a frame buffer configured to receive the sequence of processed image frames; and a projector device coupled to receive the processed image frames from the frame buffer.

18. The device of claim 14, further including: a frame buffer configured to receive the sequence of processed image frames; and a screen display coupled to receive the processed image frames from the frame buffer.

* * * * *